Dec. 29, 1959    M. M. MOORHEAD, JR., ET AL    2,918,882
DEVICE FOR CONTROL OF LOCOMOTIVE SLIPPAGE
Filed May 18, 1953    2 Sheets-Sheet 2
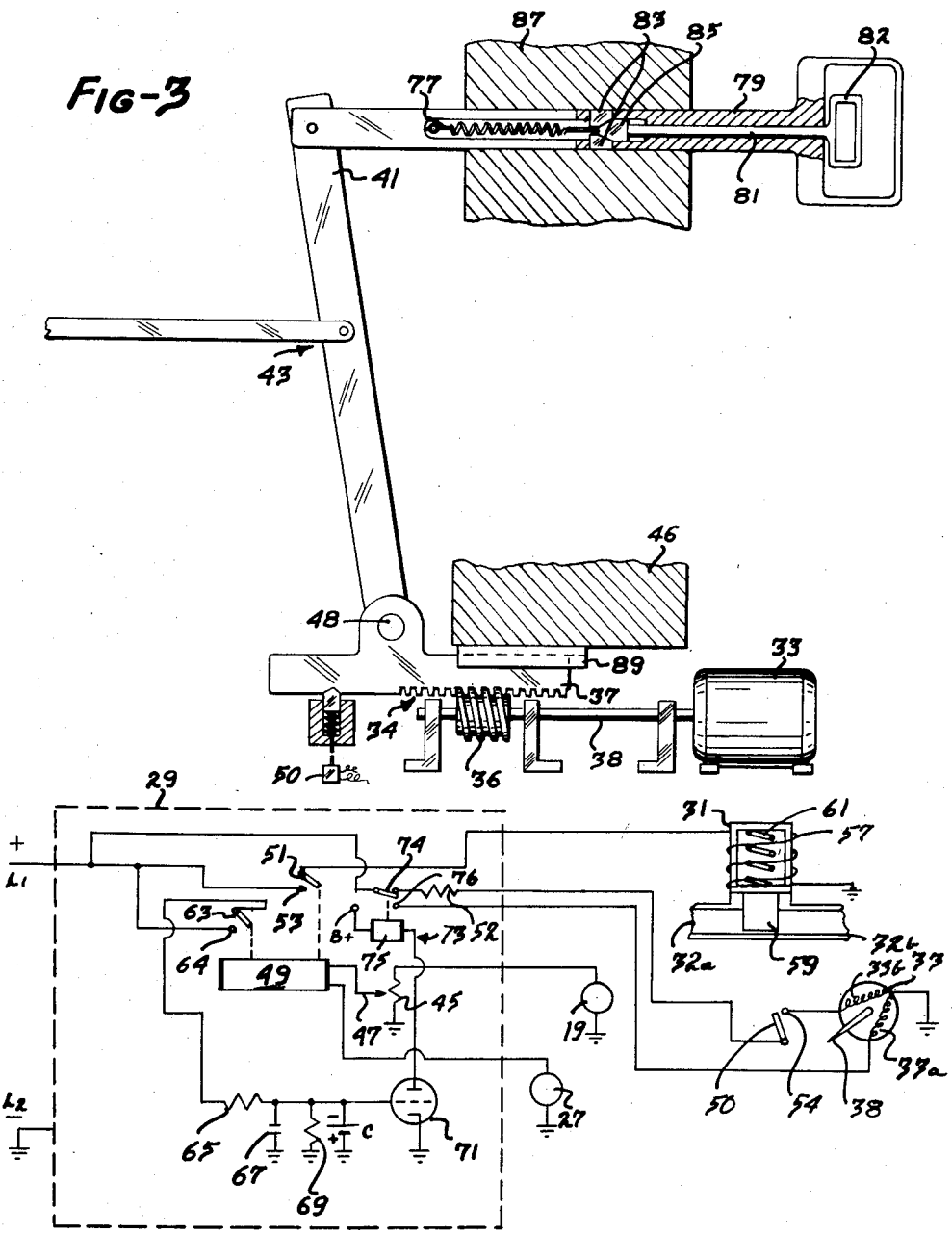
INVENTOR.
MILTON M. MOORHEAD JR.
HYMAN BRIER
BY
Toulmin & Toulmin
ATTORNEYS

United States Patent Office 2,918,882
Patented Dec. 29, 1959

2,918,882

DEVICE FOR CONTROL OF LOCOMOTIVE SLIPPAGE

Milton M. Moorhead, Jr., and Hyman Brier, Dayton, Ohio, assignors to The Commonwealth Engineering Company of Ohio, Dayton, Ohio, a corporation of Ohio Application May 18, 1953, Serial No. 355,722

2 Claims. (Cl. 105—48)

This invention relates to a system for control of slippage and is particularly concerned with the prevention of slippage of locomotive driver wheels.

Modern locomotives have a large power output capacity and accordingly are capable of pulling extremely heavy loads once they are up to speed. However, considerable difficulty is encountered during acceleration and on upgrades due to the fact that the breakaway frictional force, which is the maximum frictional force developed between the driver wheels and the tracks, is less than the capabilities of the locomotive.

In present practice the engineer of course attempts to open the throttle as widely as possible in order to attain high acceleration; a limit is imposed however by the fact that there is no reliable guide to indicate a safe throttle opening and accordingly, as the engineer eases the throttle open he eventually exceeds the safe limit and slip occurs resulting in wear on the driver wheels, flat spots on the tracks and loss of traction and momentum.

Slippage may also be occasioned by transient power impulses or slick spots on the rails; in either event upon the occurrence of slip it is necessary to close the throttle in order to regain traction.

It is a primary object of this invention to describe a system for automatically controlling the power applied to the driver wheels and thereby to inhibit slippage.

It is another object of this invention to describe a system for control of the throttle which system does not require the intervention of the engineer.

These and other allied objectives of the invention are attained by deriving voltages from both a driver wheel and an idler wheel of the locomotive, comparing the voltage outputs and developing therefrom in the slippage condition of the driver wheel a resultant voltage which is applied to valve means to control the power supplied to the driver wheels.

In the preferred embodiment of the invention the voltage outputs of the driver wheel and idler wheel shafts are made equal at all speeds during which no slippage conditions exist. Then with the occurrence of slip, the driver wheel will spin excessively, the voltage outputs will no longer be equal, and the resultant voltage of the comparison of the two voltages may be employed to govern operation of a control valve which permits by-passing of steam to the atmosphere.

The voltages outputs of the driver and idler wheels may be amplified, if desired, or the resultant voltage may be amplified if required in order to attain adequate valve control.

Also in the preferred embodiment of the invention control is exerted over the throttle valve itself in order that the same will be accurately positioned for the conditions existing; this is accomplished by providing for the summing of the effect of repetitive slip and deriving a potential which is applicable to suitable mechanism for effecting closing of the throttle valve itself.

The invention will be more fully understood by reference to the following detailed description and accompanying drawings wherein:

Figure 2 is a schematic view of a circuit illustrating a preferred embodiment of the invention with electrical operating components in normal open position; and Figure 3 is a detail view of a portion of the structure of Figure 1.

Figure 1:
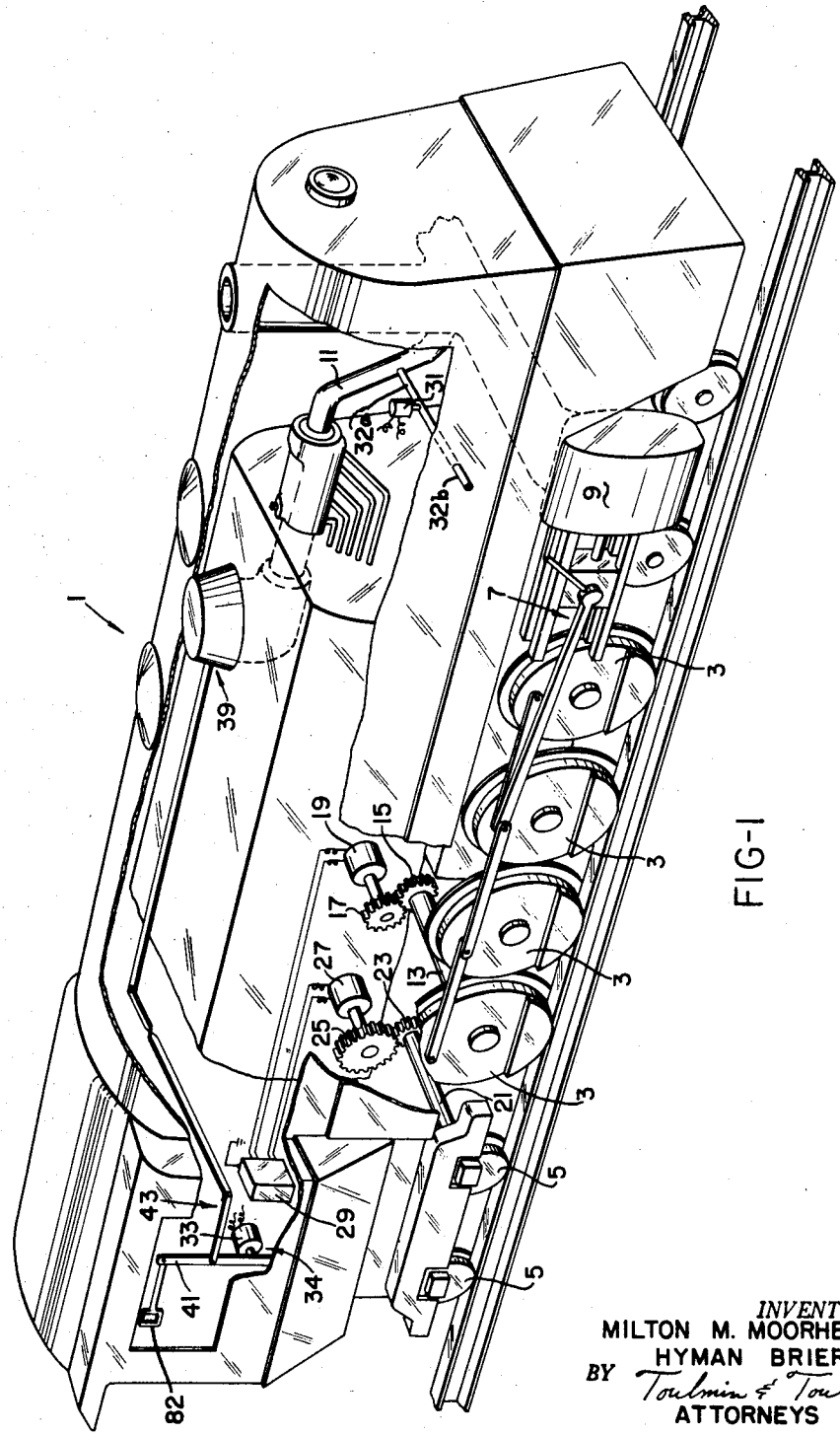
Figure 1 is a perspective view of a locomotive which includes the features of this invention.

Referring to the drawings the numeral 1 indicates a locomotive having driver wheels 3 and idler wheels 5. A linkage system indicated at 7 connects the driver wheels 3 to a piston of power cylinder 9 to which steam is applied for powering the locomotive through conduit or main steam line 11.

One of the driver wheels 3 is provided with an axle 13 which mounts a gear 15; this gear meshes with a gear 17 on the rotatable shaft of a tachometer 19 which tachometer shaft in its rotation is capable of developing a direct current voltage. Such tachometers are commercially available and a suitable electrical arrangement therefor comprises a simple armature field coil and commutator customarily found in direct current generators.

An idler wheel 5 has a shaft 21 which is provided with a gear 23; gear 23 meshes with gear 25 on tachometer 27 which similarly to tachometer 19 develops a direct current output voltage upon rotation of shaft 21.

Gears 15 and 17 of the driver wheel and gears 23, 25 of the idler wheel may be so chosen as to ratio that the outputs of each of the tachometers are equal for conditions of no slip of the driver wheel; alternatively if desired the coils of the tachometer may be so chosen as to provide equal voltages over the normal operating range. However the voltage outputs under normal running conditions are preferably made equal electrically as described hereinafter in connection with Figure 2.

The voltage outputs of each of the tachometers are fed to a comparator housing indicated at 29 which housing encloses the circuit components for effecting voltage comparison as more particularly shown in Figure 2; if a difference of potential exists between the tachometer outputs a voltage will be applied to the solenoid controlled valve 31 causing the same to open thus permitting main line steam in conduit 32a to escape to the atmosphere through conduit 32b and thereby reducing the torque applied to the driver wheels.

While the arrangement thus described is effective to limit the torque and to inhibit slippage as it starts to occur it may happen that the tendency to slip will repeat itself due to the fact that the throttle valve indicated at 39 is not in an optimum position for the conditions prevailing. To rectify this, motor 33 is provided, and, through transmission means indicated generally at 34 and comprising pinion 36 on shaft 38 it actuates rack 37 to slowly close the throttle valve. The motor is preferably not actuated until the valve 31 has been caused to open a number of times, as described hereinafter in connection with Figure 2.

The handle 41 of the throttle valve is operable manually through linkage 43 and the control of valve 39 will preferably operate slowly.

Referring now to Figure 2 the voltage developed by the tachometer illustrated at 19 will appear across the potentiometer 45 the moving arm 47 of which is so positioned that in normal operation the portion of the voltage output of tachometer 19 supplied to coil 49 will exactly balance out the voltage output of tachometer 27. This condition will prevail at all speeds for one setting of the arm in the condition of no slip and accordingly the movable relay contact 51 associated with coil 49 will remain in the open position shown.

When slippage on the driver wheel 3 occurs, the rotational speed thereof will increase but the idler wheel is unaffected and accordingly the output voltage applied to coil 49 of relay 51 by tachometer 19 is greater than the output of tachometer 27 and a resultant voltage appears across the relay energizing the same. Coil energization causes contact 51 to close with contact 53—the dotted line between contact 51 and coil 49 indicating the association of the coil and movable relay contact 51. Power line conductors L1, L2 the latter of which is grounded supply power to the system (Figure 2).

Closure of the relay contact 51 applies through fixed contact 53 which is itself connected to L1 a voltage to coil 57 energizing the solenoid of valve 31 and thereby causing the valve member 59 to open against the spring 61 thus permitting steam to escape to the atmosphere through conduit 32b and reducing the torque on the driving wheel of the locomotive. This torque reduction permits the necessary tractive force to return to the driver wheel and thus slip is inhibited.

Simultaneously with the closing of relay contact 51 movable contact 63—also associated with coil 49—closes with fixed contact 64 and potential is applied across condenser 67 through resistor 65. This condenser and resistor are chosen to have a time constant such that condenser 67 will become substantially fully charged only after a number of closely spaced impulses of valve 31; in general the resistance 65 may suitably have a value of one megohm while condenser 67 has a value of 0.1 microfarad.

Closely spaced impulses of valve 31 may occur when valve 39 is not in an optimum position for prevailing conditions—for instance, track conditions; repetitive slippage would then cause repetitive impulsing of valve 31. Thus the time constant network of the condenser and resistor function as means to count the pulses.

To prevent charge building up on condenser 67 indefinitely resistor 69 is provided which permits the charge to leak to ground very slowly.

Should a number of impulses occur within a short period the condenser 67 will assume a large charge and the grid of triode 71, which tube is normally maintained at cutoff in any suitable manner as by a "C" battery designated C, will tend to become more positive permitting plate current flow. Flow in the plate circuit energizes relay 73 through coil 75 thus applying a potential to motor 33 through movable contact 74, fixed contact 76 and motor coil 33a thereby causing the throttle valve 39 to move slowly towards a closed position (not shown). As shown in Figure 2 the potential, due to conductance in tube 71 is applied from the plus side through motor 33 to ground and accordingly motor 33 (Figure 3) is continually urging the rack 37 in a direction to close valve 39, the valve being closed slowly through the linkage 43 (Figures 1 and 3) when tube 71 is conducting. Such action reduces the torque to the driver wheel and effectively provides the optimum throttle setting for the conditions prevailing.

When the tendency towards slippage ceases and the charge has leaked off condenser 67 to restore tube 71 to cutoff relay 73 will have become de-energized; relay contact 74 then returns to its normally closed position (Figure 2). Due to the driving of the rack 37 switch 50 has been closed (Figure 3) with contact 54 (Figure 2) and accordingly power is now applied to coil 33b through switch 50, current limiting resistor 52 and the relay contact 74. Accordingly motor 33 rotates in the reverse direction and this moves rack 37 until the rack again assumes the normal condition on frame 46 of Figure 3, with switch 50 open. Thus the valve 39 is returned to its normal operating condition after slippage has stopped and the return operation is relatively slow since the resistor 52 limits the current flow to the motor 33.

The handle portion 41 pivoted at 48 is also operable manually to position the valve; thus the rod 81 carries a release grip 82 and the rod is longitudinally movable in guide 79 which is itself normally held immovable in support 87 by the wedge or friction blocks 83 forced thereagainst by the wedge member 85 as shown. When retracted against tension spring 77 the guide 79 is movable to actuate the linkage 43 and the valve.

In either case the motor returns the rack to the neutral position following the corrective action. Also the engineer may himself return the valve to position as desired.

It is thus seen that the objectives of the invention are achieved with the structure of invention and that automatic control of the slippage conditions inherent to locomotive operation are attained. The system however is also adaptable to other powered mobile apparatus wherein the application of power may be controlled by the effects of an abnormal condition occurring in the operation of the unit.

It will be understood that this invention is susceptible to modification in order to adapt it to different usages and conditions and accordingly, it is desired to comprehend such modifications within this invention as may fall within the scope of the appended claims.

We claim:

1. In a system for controlling locomotive wheel slippage, in combination with a locomotive, a throttle valve of the locomotive, mechanism connected to operate the throttle valve, a driver wheel axle and an idler wheel axle of the locomotive, tachometer generator means driven by each of the said axles, a first relay having a coil which connects the outputs of said tachometer generator means of the axles in electrical opposition whereby an unbalanced voltage of the said tachometer generator means actuates said relay, a movable first contact of said relay having a first open position and a second closed position, a fixed contact of said relay with which said first contact closes, a source of direct current voltage and a pair of conductors connected thereto, said fixed contact being connected to a first one of said conductors, the other of said conductors having a connection to ground, an electron discharge tube having an anode, a cathode and a grid, a resistance element connecting said grid and said movable contact, a ground connection to said cathode, a capacitor connecting said grid electrically to the ground connection, a second relay having a coil connected in series with said anode whereby said relay is actuated when said tube is conductive, a movable contact of said last named relay connected to said first one of said conductors and having a first normally closed position and a second closed position, first and second fixed contacts of said last named relay, a reversible electric motor, means connecting the electric motor and second fixed contact of the last named relay in electrical series across the said conductors for driving the electric motor in one direction of rotation, means connecting the electric motor, a current limiting resistor and a switch in electrical series with the first fixed normally closed contact across the conductors for driving the electric motor in a second direction of rotation, means mechanically connecting the electric motor to said mechanism for operation of the throttle valve, means carried by said last named means to selectively actuate and de-actuate the said switch in series with the motor, said latter named means being arranged to de-actuate the switch in the normal operating position of the throttle valve.

2. In a system for controlling locomotive wheel slippage, in combination with a locomotive, a throttle valve of the locomotive, mechanism connected to operate the throttle valve, a driver wheel axle and an idler wheel axle of the locomotive, tachometer generator means driven by each of the said axles, a first relay having a coil which connects the outputs of said tachometer generator means of the axles in electrical opposition whereby an unbalanced voltage of the said tachometer generator means actuates said relay, a movable first contact of said relay having a first open position and a second closed position, a fixed contact of said relay with which said first contact closes, a source of direct current voltage and a pair of conductors connected thereto, said fixed contact being connected to a first one of said conductors, the other of said conductors having a connection to ground, an electron discharge tube having an anode, a cathode and a grid, a resistance element connecting said grid and said movable contact, a ground connection to said cathode, a capacitor connecting said grid electrically to the ground connection, a second relay having a coil connected in series with said anode whereby said relay is actuated when said tube is conductive, a movable contact of said last named relay connected to said first one of said conductors and having a first normally closed position and a second closed position, first and second fixed contacts of said last named relay, a reversible electric motor, means connecting the electric motor and second fixed contact of the last named relay in electrical series across the said conductors for driving the electric motor in one direction of rotation, means connecting the electric motor, a current limiting resistor and a switch in electrical series with the first fixed normally closed contact across the conductors for driving the electric motor in a second direction of rotation, a rack and pinion carried by the mechanism which operates the throttle valve, a shaft of said motor carrying the pinion, means engageable with the rack and with said switch to actuate the switch, and other means of the rack arranged to de-actuate the switch in the normal operating position of the throttle valve.

References Cited in the file of this patent

UNITED STATES PATENTS

| | | |
|---|---|---|
| 1,121,988 | Doyle et al. | Dec. 22, 1914 |
| 1,933,780 | Williamson | Nov. 7, 1933 |
| 1,976,369 | Platte | Oct. 9, 1934 |
| 2,250,191 | Crooks | July 22, 1941 |
| 2,321,059 | Anderson | June 8, 1943 |
| 2,407,521 | St. Palley | Sept. 10, 1946 |
| 2,494,435 | Freeman | Jan. 10, 1950 |
| 2,549,653 | Wilson | Apr. 17, 1951 |
| 2,592,342 | Ryckman | Apr. 8, 1952 |
| 2,626,362 | Johansson | Jan. 20, 1953 |
| 2,652,555 | Smith | Sept. 15, 1953 |
| 2,701,301 | Mullarky | Feb. 1, 1955 |
| 2,701,873 | Bard | Feb. 8, 1955 |
| 2,806,149 | Lillquist | Sept. 10, 1957 |